UNITED STATES PATENT OFFICE.

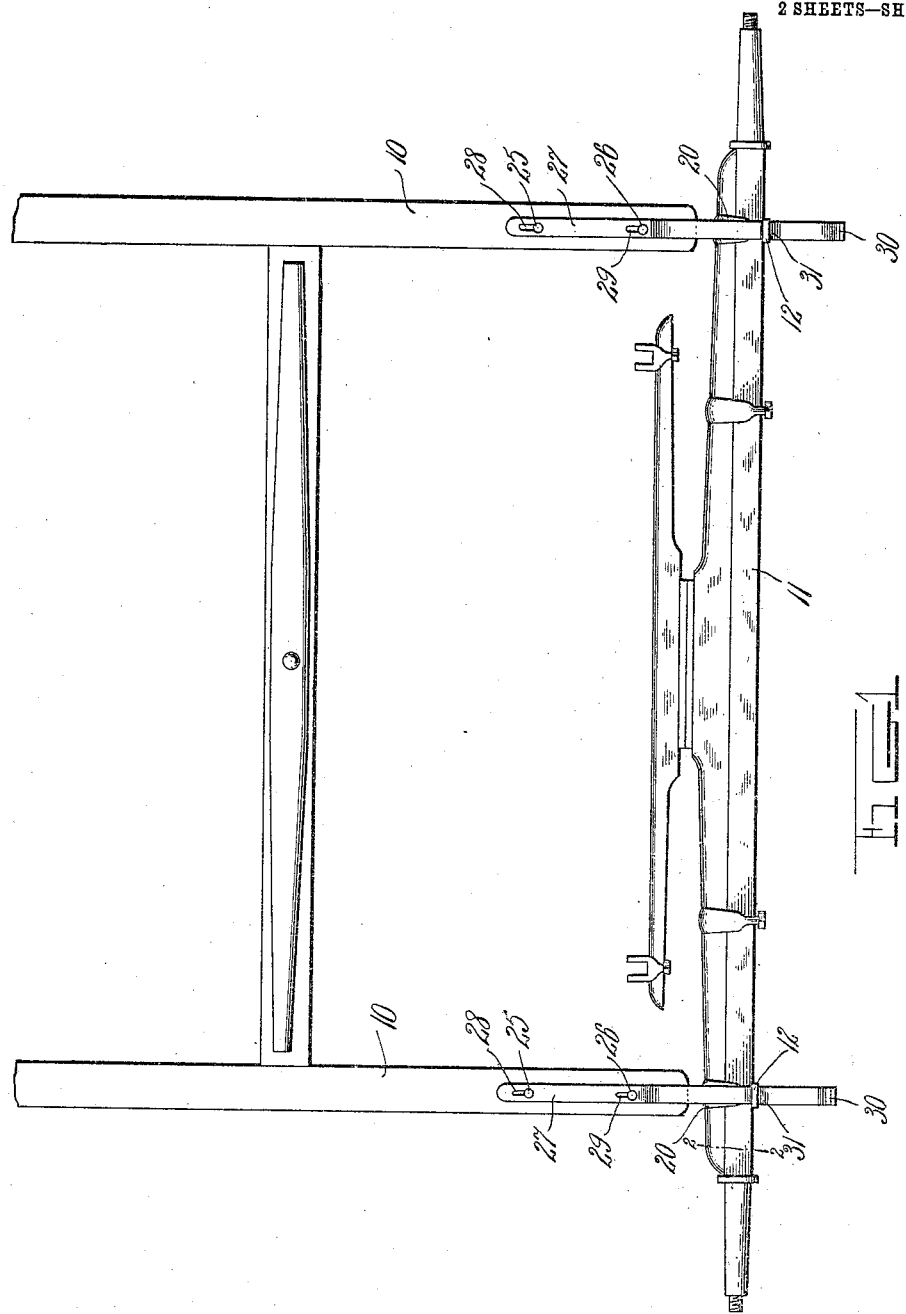

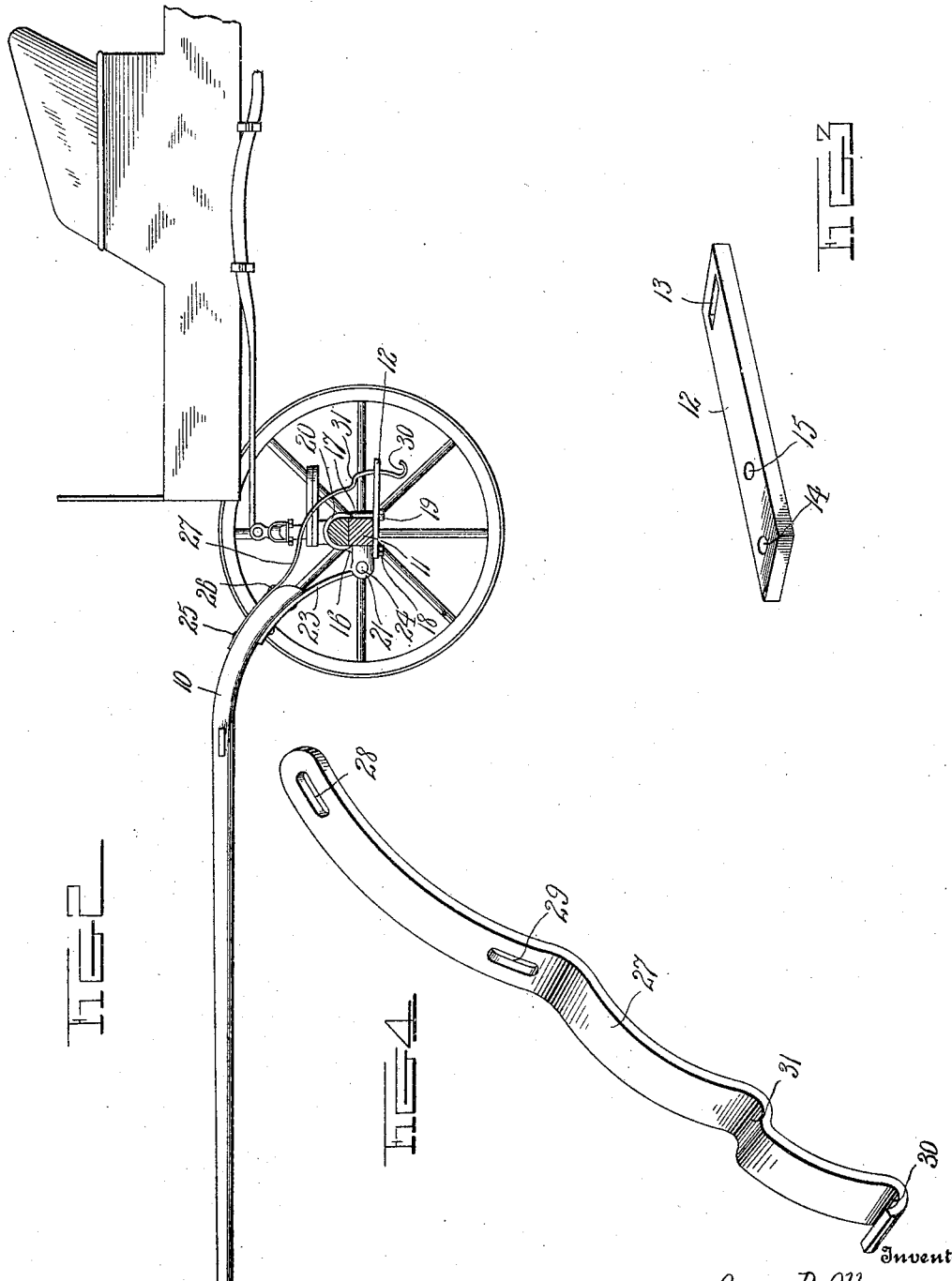

OSCAR B. OLLER AND CLAUDIUS M. HILL, OF HIGHLAND, CALIFORNIA.

VEHICLE-SHAFT HOLDER.

956,154.   Specification of Letters Patent.   Patented Apr. 26, 1910.

Application filed October 23, 1908. Serial No. 459,228.

*To all whom it may concern:*

Be it known that we, OSCAR B. OLLER and CLAUDIUS M. HILL, citizens of the United States, residing at Highland, in the county of San Bernardino, State of California, have invented certain new and useful Improvements in Vehicle-Shaft Holders; and we do hereby declare the following to be a full, clear, and exact description of the invention, such as will enable others skilled in the art to which it appertains to make and use the same.

This invention relates to attachments for vehicles for holding the shafts or thills in an elevated position, and to facilitate the hitching up of the horse, and likewise to maintain the thills in elevated position when not in use, and has for one of its objects to simplify and improve the construction, and increase the efficiency and utility of devices of this character.

Another object of the invention is to provide a simply constructed device which may be readily applied to vehicles of various sizes and forms without material structural changes in the vehicle.

With these and other objects in view the invention consists in a plate having a slot at one end and spaced apertures near the other end and adapted to engage over the threaded studs of a thill clip and a bar having means at one end for attachment to the thills and slidably engaging through the slot of the plate and provided with a lateral offset at its free end and at an intermediate point, the end offset adapted to prevent the bar from being wholly withdrawn from the slotted plate and the intermediate offset adapted to support the thills yieldably in an elevated position.

The invention further consists in certain novel features of construction as hereafter shown and described and specifically pointed out in the claim, and in the drawings illustrative of the preferred embodiment of the invention, Figure 1 is a rear elevation of the forward axle of a vehicle and the thills, together with the thill clips with the improvement applied. Fig. 2 is a section on the line 2—2 of Fig. 1. Fig. 3 is a perspective view of the holding plate which is attached to the thill clip. Fig. 4 is a perspective view of the holding bar which is attached to the thills.

The improved device may be applied without material structural changes to vehicles of various forms and sizes, and for the purpose of illustration is shown applied to a conventional pair of thills and to a conventional axle, the thills represented at 10 and the axle at 11.

The improved device comprises in general a plate 12 having a slot 13 at one end and with spaced apertures 14—15, the latter adapted to engage over the threaded studs 16—17 of the thill clip, and retained in position by the usual clamp nuts 18—19. The upper portion of the thill clip is of the usual form and comprises the plate 20 bearing over the body of the axle 11 and provided with spaced ears 21 in which the thill irons 23 are pivoted at 24. The plate 12 thus takes the place of the ordinary keeper of the thill clip, and extends rearwardly of the axle, as shown.

Attached by bolts 25—26 to the thills 10 at each side is a resilient bar 27, the plate having longitudinal slots 28—29 to receive the bolts 25—26, so that the member 27 may be adjusted upon the thills within the range of the slots. The bars 27 are curved for a portion of their lengths to correspond to and closely engage the curved portions of the thills and this curving will correspond to the curve of the thills, and may be varied in thills of different curvatures, as will be obvious. The lower portions of the bars 27 are curved rearwardly and downwardly and provided with a lateral offset or hook 30 at their free ends and with a lateral offset 31 intermediate the ends, the bar slidably engaging through the slot 13 of the plate 12. One of the plates 12 and one of the bars 27 will be arranged at each side, as above noted, but as they are precisely alike a description of one will suffice for both.

The hook portions 30 of the bars will be so located that they engage with the portion of the plate 12 rearwardly of the slot 13 only when the thills are in their downward position. The intermediate offsets 31 are so located that they engage beneath the portion of the plate 12 rearwardly of the slot 13 when the thills are in elevated position, or in the ordinary position in which thills are arranged when not in use. By this arrangement when it is desired to hitch up the horse, or to store the vehicle in a shed or stable, the thills are elevated until the offsets 31 engage with the plate 12, the resiliency of the bars 27 being sufficient to maintain the thills in their elevated position against their own weight, but which will yield to pressure exerted to move the thills downwardly or into operative position. Thus when it is desired to hitch up the horse the thills are elevated, the horse backed beneath the thills, and the latter lowered into position alongside the horse, and the hitching operation completed. It will be further noted that when a horse is unharnessed it is customary to unfasten the back strap and detach the tugs from the whiffletree when the animal is then driven forward. This frequently results in the thills striking the ground violently with accompanying injury, but in the present instance by the provision of the hooks 30 which engage beneath the rear ends of the members 12 the front ends of these thills are prevented from striking the ground and the resiliency of the members 27 permits them to drop without injury.

The improved device is simple in construction, can be inexpensively manufactured, and applied without material structural changes either in the running gear of the vehicle or in the members 12—27.

What is claimed, is—

The combination with an axle, of a thill clip mounted thereon provided with a thill clip plate elongated to the rear of the axle and having a rectangular perforation adjacent its rear end; with a thill pivoted to said thill clip, and a resilient member mounted on the thill passing through and guided by the rectangular opening in the thill plate, said resilient member being provided with a plurality of means to engage the rear of the clip plate and positively hold the thills in a plurality of raised positions, one of said engaging means being arranged to prevent withdrawal of the resilient member from the perforation in the thill plate.

In testimony whereof, we affix our signatures in presence of two witnesses.

OSCAR B. OLLER.
CLAUDIUS M. HILL.

Witnesses:
M. M. RANDALL,
A. D. ROUELL.